United States Patent Office 3,439,664
Patented Apr. 22, 1969

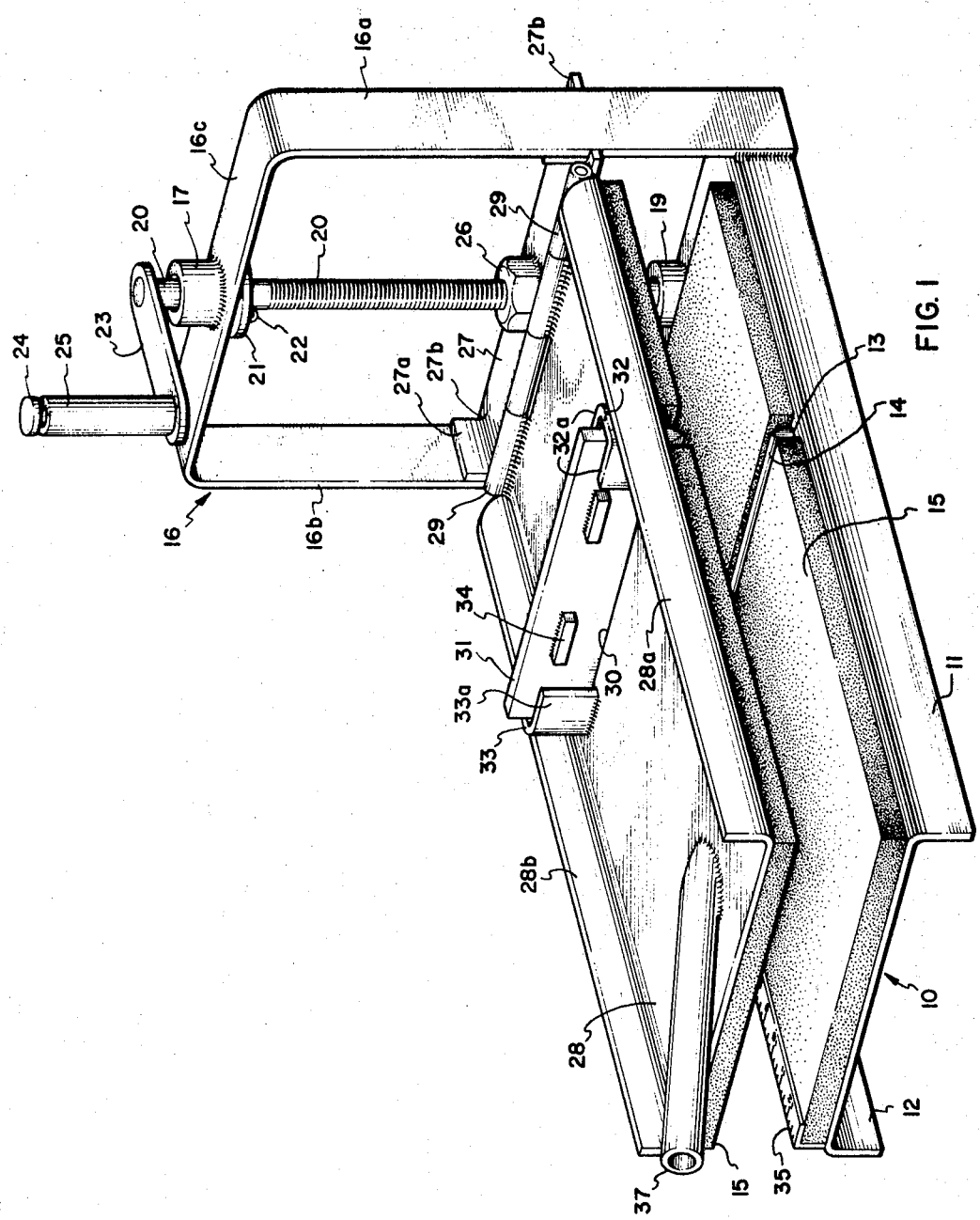

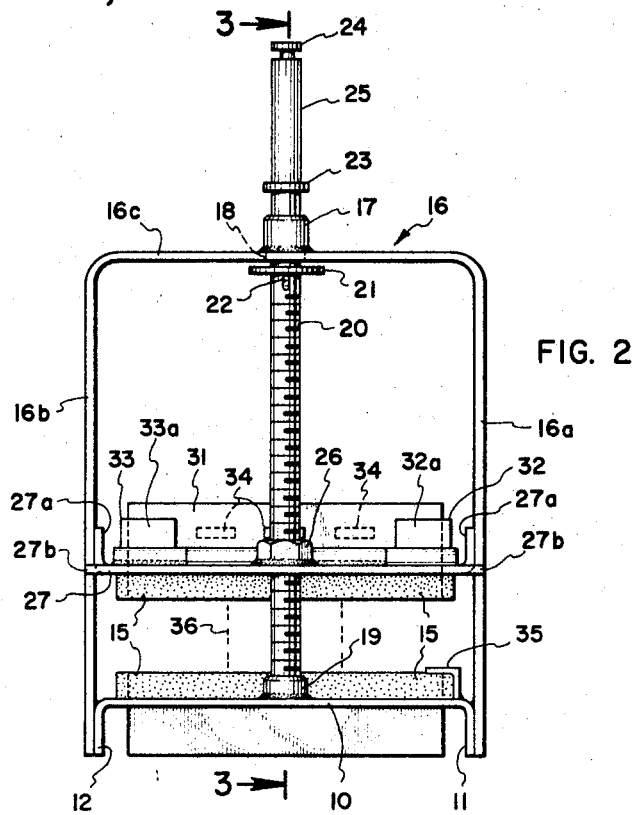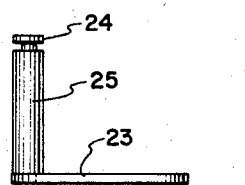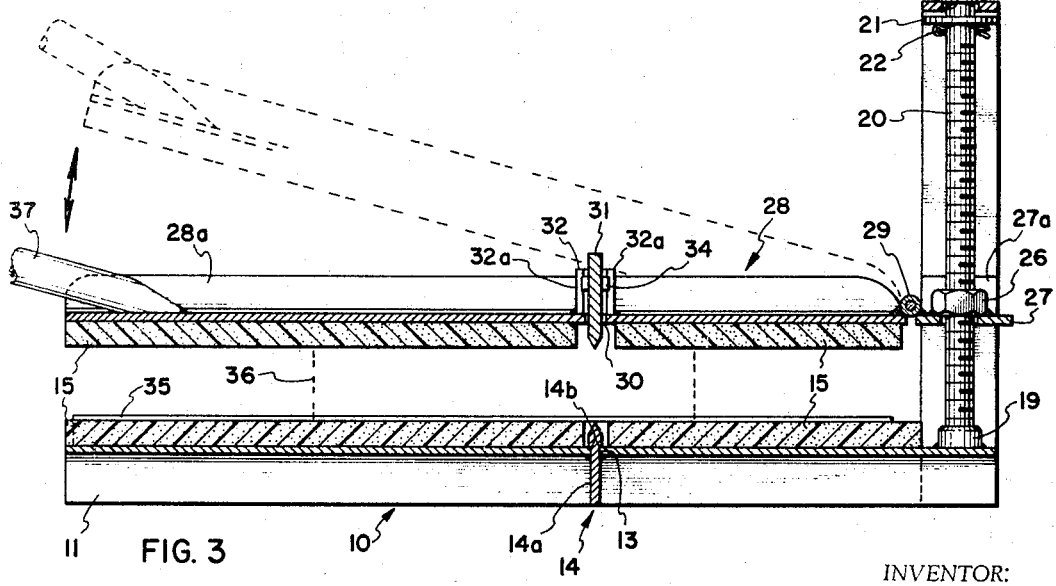

3,439,664
MASONRY CUTTER
Ronald R. Sylvester, 902 East 12650 South,
Draper, Utah 84020
Filed Mar. 8, 1967, Ser. No. 621,598
Int. Cl. B28d 1/26, 7/04
U.S. Cl. 125—23     5 Claims

ABSTRACT OF THE DISCLOSURE

A machine for cutting masonry such as bricks and the like to desired size. A cushioned bottom plate has a cutting blade projecting upwardly therefrom and a pivoted, cushioned, upper plate has a corresponding blade arranged to be impacted to initially break the brick. The upper plate is vertically adjustable to insure its being arranged to apply even pressure to the masonry item to thereby prevent undesired fracturing.

Brief summary of the invention

This invention relates to masonry cutting apparatus, and particularly to apparatus used for sizing bricks.

In a past a number of devices have been developed for use in cutting masonry. Examples of these are shown in U.S. Patent No. 2,777,438 and U.S. Patent No. 3,161,190. These patented devices are intended to provide inexpensive, easily transportable machines for use in masonry cutting. Nevertheless, so far as I am aware, there has not heretofore been developed a machine for cutting masonry, and especially for sizing bricks, that "cuts" them in the highly advantageous manner of the present invention, quickly and without simultaneously fracturing the masonry item along undesired planes. Furthermore, although more recently developed masonry cutters have been greatly simplified in construction and operation in comparison with earlier machines developed for the purpose, there is still room for improvement in this area.

Objects of the present invention are to provide a masonry cutter that is low in cost, easily transportable, and easily operated to provide a smooth cut where desired, without causing undesired fracturing of the masonry item being sized.

Principal features of the invention are the large, cushion covered, top and bottom platforms and the adjustment means for the top platform by which it is adjusted so that pressure will be evenly applied over the entire top surface of the masonry item being cut.

Opposing top and bottom blades are arranged to initiate cutting and to determine a fracture plane and the top blade is arranged to travel in a single plane, for a limited distance, and is easily impacted to insure a sharp cutting action. The blades are removable for sharpening or they can easily be replaced.

The drawings

In the drawings:

FIG. 1 is a perspective view of a masonry cutter of the invention;

FIG. 2, an end elevation view; and

FIG. 3, a side elevation view, with the raised position of the top plate and a brick position to be cut, shown in broken lines.

Detailed description

Referring to the drawings:

In the illustrated preferred embodiment, the invention includes a base 10 that may have its side edges 11 and 12 turned down to act as supporting legs for the cutter unit. A slot 13 is provided in the base 10, and extends transversely between the legs 11 and 12.

The shank 14a of a bottom blade 14 is dropped through the slot 13 until shoulders 14b of the blade rest on the base 10. Preferably, the shank extends very nearly to the bottom of the legs 11 and 12 so that when a masonry item is "cut" in the manner to be disclosed the shank will react solidly against surface on which the cutter unit is placed. The bottom blade can be spot welded to the base 10, but this is not always necessary and, in fact, it may be preferrtd to not weld the blade in place, thereby permitting it to be more easily removed for sharpening or replacement.

A layer of cushion material 15 is placed over the upper surface of base 10, but does not cover the upwardly protruding bottom blade. In its uncompressed state the cushion material will normally extend upwardly from the base to be at least level with the top, or cutting edge, of the blade.

Foamed polyurethane plastic material has been found to be an excellent cushioning material because of its superior impact absorbent and sound deadening characteristics. The cushion material is preferably glued to the upper surface of the base, but obviously could be attached in any other convenient manner.

An inverted, U-shaped, frame 16 has its legs 16a and 16b attached to the base at one end thereof, with the connecting portion 16c extending substantially parallel to the top surface of the base.

A collar 17 is fixed to the top of connecting portion 16c and surrounds a hole 18 through the connecting portion.

A bearing cup 19 is fixed to the top surface of base 10, directly beneath hole 18 in connecting portion 16c and a shaft 20 extends downwardly through collar 17 and hole 18 into the bearing cup 19.

A washer 21 surrounds shaft 20 beneath the connecting portion 16c and a cotter pin 22, through the shaft, keeps washer 21 from sliding down, and the shaft 20 from moving upwardly, out of bearing cup 19.

The upper end of shaft 20 has a crank made up of a horizontal arm 23 and an upright arm 24. In conventional fashion a tubular handle 25 is journaled around the upright arm.

The portion of shaft 20 extending between bearing cup 19 and cotter pin 22 is threaded and has a threaded nut 26 thereon. A pivot plate 27 is fixed to nut 26, by welding, or the like, and extends between the legs 16a and 16b of the frame 16.

A central portion 27a at each end of pivot plate 27 is preferably turned upwardly to provide slide surfaces that will move along the legs of frame 16 and that will cooperate with ears 27b that protrude beyond the legs at each side of each upturned central portion 27a to hold the pivot plate in alignment with respect to the frame and to prevent lateral twisting of the pivot plate as it is moved up and down by rotation of shaft 20.

Rotation of shaft 20, by an operator grasping handle 25 and turning, moves nut 26 and the pivot plate affixed thereto up or down, depending upon the direction of rotation of the shaft.

A top plate 28 is pivotally connected to pivot plate 27 by a hinge 29 and the top plate is pivotable between a raised position and a lowered position wherein the under surface of the top plate is in face-to-face relationship with the top surface of the base 10.

Additional cushion material 15 is affixed to the undersurface of the top plate and a transverse slot 30 is provided in the top plate, through which a top blade 31 can travel.

The top plate preferably has its edges 28a and 28b turned up to provide additional strength for the plate and a pair of channel guides 32 and 33 are affixed to the top surface of the top plate so that their respective legs 32a and 33a straddle the slot 30.

Top blade 31 is positioned in the slot 30 and within the legs of guides 32 and 33. It is freely movable downwardly through the slot until stops 34 on one or both faces of the blade come to rest on the upper surface of the top plate. The stops thus serve to prevent the blade falling through the top plate.

A handle 37 extends outwardly from top plate 28 at the end opposite hinge 29, to enable a downward pressure to be applied through the top plate to a brick or other masonry item placed between the base and top plate.

A measuring scale 35 extends upwardly from base 10, at one side thereof, and inwardly over the cushion material 15 on the base. The scale is preferably graduated, as shown, in both directions, away from a common starting point that is aligned with the cutting edge of blade 14.

In use, the masonry cutter is set up for operation by placing the legs 11 and 12 of base 10 on a firm supporting surface. The handle 37 is then grasped to raise the top plate 28, as shown in dotted lines, FIG. 3, so that it will be out of the way.

A brick or other masonry item, shown in broken lines at 36, FIG. 3, is placed on the cushion material 13 of the base, with the item positioned such that blade 14 is directly beneath the location on the brick where a cut is to be made. The top plate 28 is pivoted down to rest on the item and handle 25 is grasped to turn crank arms 24 and 23 and shaft 20. This moves nut 26 and the pivot plate 27 carried thereby up or down, until the cushion material 13 on the undersurface of top plate 28 rests substantially flush on the item.

Top plate 31 is thus positioned opposite blade 14 and has its cutting edge resting on the item. Downward pressure is applied to handle 37 to compress the item between the layers 15 of cushion material on the base and top plate, respectively, and a sledge, or similar tool, is used to strike the top edge of blade 31, thereby driving it towards blade 14 and initiating a fracture plane at the top and bottom surfaces of the item. The compressive force being applied by the shock absorbing cushion material to the tops and the bottoms of masonry items and prevents fracturing, except on the plane defined by the opposing blades and the masonry items can be cut with a minimum of waste, as compared to that resulting from the use of other known masonry cutters.

Whereas this invention is here described and illustrated with respect to a certain form thereof, it is to be understood that many variations are possible without departing from the subject matter particularly pointed out in the following claims, which subject matter I regard as my invention.

I claim:
1. A cutter for masonry items comprising
a base, having an upper broad flat face;
a layer of cushion material on the upper face of the base;
a blade extending transversely across said base and adapted to protrude upwardly therefrom through said cushion material to form a cutting edge;
a top plate, having a broad flat undersurface;
a layer of cushion material on the undersurface of the top plate;
an opposed blade slidably mounted on said top plate and adapted to extend downwardly through said top plate cushion material;
adjustment means extending parallel to the upper face of the base;
means pivotally connecting the top plate to the adjustment means such that the top plate can be swung through an arc wherein it is in face-to-face relationship with the base; and
means for moving said adjustment means toward and away from the base.

2. A cutter for masonry items, as recited in claim 1, further including
a handle projecting from the top plate at its end opposite the means pivotally connecting the top plate to the adjustment means.

3. A cutter for masonry items, as recited in claim 2, further including
an inverted, U-shaped frame having its legs fixed to opposite sides of the base; and wherein
the adjustment means comprises a pivot plate guided by the said U-shaped frame in movement toward and away from the base.

4. A cutter for masonry items, as recited in claim 3, wherein
the means for moving the pivot plate toward and away from the base comprises a threaded shaft journaled through the portion of the U-shaped frame connecting the legs and into a cup carried by the base;
a nut threaded onto said shaft and fixed to the pivot plate; and
means for rotating said shaft.

5. A cutter for masonry items, as recited in claim 4, wherein
the means for rotating the shaft comprises a crank handle fixed to the upper end of the shaft.

References Cited

UNITED STATES PATENTS

| | | | |
|---|---|---|---|
| 2,289,985 | 7/1942 | Nastri | 125—23 |
| 2,810,946 | 10/1957 | Garnich. | |
| 1,928,458 | 9/1933 | Mitchell | 225—105 |

FOREIGN PATENTS

| | | |
|---|---|---|
| 212,244 | 1/1958 | Australia. |

HAROLD D. WHITEHEAD, *Primary Examiner.*

U.S. Cl. X.R.

225—103